US009845647B2

(12) United States Patent
Galindo et al.

(10) Patent No.: US 9,845,647 B2
(45) Date of Patent: Dec. 19, 2017

(54) VISCOSIFIERS AND FILTRATION CONTROL AGENTS FOR USE IN HIGH TEMPERATURE SUBTERRANEAN OPERATIONS

(71) Applicant: Halliburton Energy Services, Inc., Houston, TX (US)

(72) Inventors: Kay Ann Galindo, Montgomery, TX (US); Jay Paul Deville, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/119,795

(22) PCT Filed: Apr. 17, 2015

(86) PCT No.: PCT/US2015/026299
§ 371 (c)(1),
(2) Date: Aug. 18, 2016

(87) PCT Pub. No.: WO2016/167787
PCT Pub. Date: Oct. 20, 2016

(65) Prior Publication Data
US 2017/0051196 A1 Feb. 23, 2017

(51) Int. Cl.
*E21B 21/00* (2006.01)
*C09K 8/12* (2006.01)
(Continued)

(52) U.S. Cl.
CPC ............ *E21B 21/003* (2013.01); *C09K 8/035* (2013.01); *C09K 8/12* (2013.01); *C09K 8/42* (2013.01);
(Continued)

(58) Field of Classification Search
None
See application file for complete search history.

(56) References Cited

U.S. PATENT DOCUMENTS 4,676,317 A * 6/1987 Fry .......................... C04B 24/18
106/719
4,678,591 A * 7/1987 Giddings ................. C09K 8/24
507/106

(Continued)

FOREIGN PATENT DOCUMENTS

WO 02014209485 * 12/2014 ........... C08F 220/56

OTHER PUBLICATIONS

International Search Report and Written Opinion issued in related PCT Application No. PCT/US2015/026299 dated Jan. 15, 2016, 10 pages.

*Primary Examiner* — Anuradha Ahuja
(74) *Attorney, Agent, or Firm* — Tenley Krueger; Baker Botts L.L.P.

(57) ABSTRACT

Treatment fluids comprising viscosifiers and filtration control agents that may be useful at high temperatures and methods for using the treatment fluids to treat subterranean formations are provided herein. A method of treating a subterranean formation comprising: providing a treatment fluid comprising: an aqueous base fluid, a tetrapolymer that comprises at least one monomer, and a graft copolymer that comprises: a backbone comprising a lignite, and at least one monomer; and introducing the treatment fluid into a wellbore penetrating the subterranean formation.

20 Claims, 1 Drawing Sheet

(51) Int. Cl.
  *C09K 8/035*   (2006.01)
  *C09K 8/42*    (2006.01)
  *C09K 8/575*   (2006.01)
  *C09K 8/68*    (2006.01)
  *C09K 8/88*    (2006.01)

(52) U.S. Cl.
  CPC ............. *C09K 8/5753* (2013.01); *C09K 8/68* (2013.01); *C09K 8/882* (2013.01)

(56) References Cited

U.S. PATENT DOCUMENTS

| | | | |
|---|---|---|---|
| 4,938,803 A * | 7/1990 | Huddleston | C04B 24/16 106/669 |
| 5,028,271 A * | 7/1991 | Huddleston | C04B 24/16 106/720 |
| 9,410,069 B2 | 8/2016 | Zha et al. | |
| 2008/0194433 A1 | 8/2008 | Tehrani | |
| 2010/0256018 A1* | 10/2010 | Ezell | C09K 8/512 507/119 |
| 2011/0297377 A1* | 12/2011 | Tarafdar | C04B 28/02 166/293 |
| 2014/0342952 A1 | 11/2014 | Suryawanshi et al. | |
| 2016/0272868 A1* | 9/2016 | Wang | C09K 8/512 |

* cited by examiner

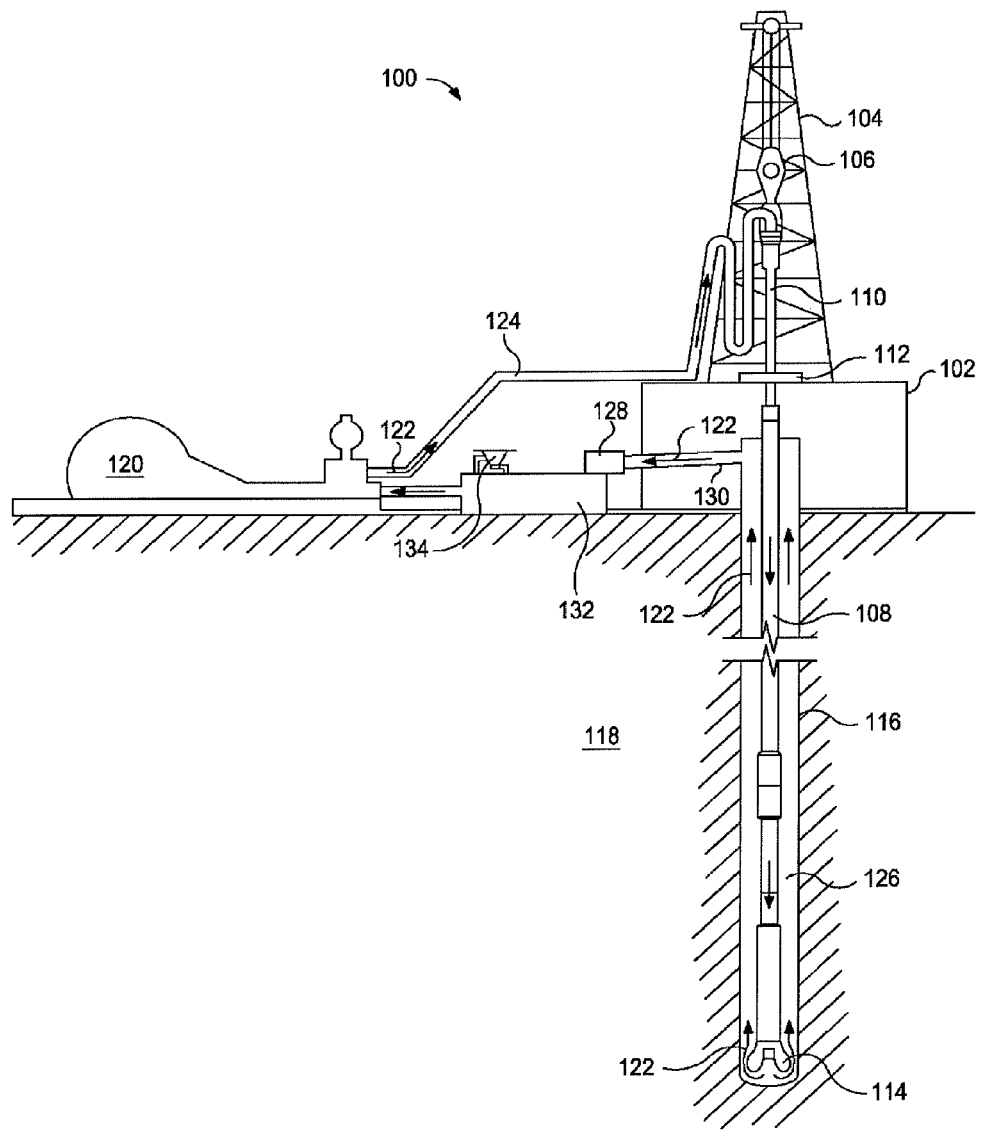

VISCOSIFIERS AND FILTRATION CONTROL AGENTS FOR USE IN HIGH TEMPERATURE SUBTERRANEAN OPERATIONS

CROSS-REFERENCE TO RELATED APPLICATION

The present application is a U.S. National Stage Application of International Application No. PCT/US2015/026299 filed Apr. 17, 2015, which is incorporated herein by reference in its entirety for all purposes.

BACKGROUND

The present disclosure relates to systems and methods for treating subterranean formations.

Treatment fluids can be used in a variety of subterranean treatment operations to increase and/or improve hydrocarbon (e.g., oil and gas) recovery. As used herein, the terms "treat," "treatment," "treating," and grammatical derivatives thereof refer to any subterranean operation that uses a fluid in conjunction with achieving a desired function and/or for a desired purpose. Use of these terms does not imply any particular action by the treatment fluid. Illustrative treatment operations can include, for example, drilling operations, cementing operations, fracturing operations, gravel packing operations, acidizing operations, scale dissolution and removal, consolidation operations, and the like.

Treatment fluids often contain additives to impart desired physical and/or chemical characteristics to the fluid. Such additives include viscosifiers and fluid loss additives. Existing viscosifiers and fluid loss additive may degrade in high temperature applications which may cause the treatment fluid to prematurely lose viscosity and/or to be lost into the subterranean formation rock matrix.

BRIEF DESCRIPTION OF THE DRAWINGS

These drawings illustrate certain aspects of some of the embodiments of the present disclosure, and should not be used to limit or define the claims.

FIG. 1 is a diagram illustrating an example of a wellbore drilling assembly that may be used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to compositions and methods for treating subterranean formations. More particularly, the present disclosure relates to treatment fluids comprising viscosifiers and filtration control agents that may be useful at high temperatures, and methods for using the treatment fluids to treat subterranean formations.

The present disclosure provides compositions for treating a subterranean formation comprising an aqueous base fluid, a tetrapolymer, and a graft copolymer comprising a lignite backbone. In the method of the present disclosure, the compositions disclosed herein may be introduced into a subterranean formation, for example, via a wellbore penetrating at least a portion of the subterranean formation.

Treatment fluids typically contain additives to impart desired physical and/or chemical characteristics to the fluid. Viscosifiers control and change the viscosity of treatment fluids. Without viscosity control, the viscosity of the treatment fluid could undesirably change as a result of temperature variation during the treatment fluid's transit from the well surface to the bottom of the wellbore and back. Maintaining sufficient viscosity in treatment fluids is important for a number of reasons, including, but not limited to, particulate transport, wellbore stability, control and/or reduction of fluid loss into the subterranean formation, and/or diversion of the flow of fluids present within the subterranean formation to other portions of the formation.

Although viscosifiers may partially control and/or reduce fluid loss into the subterranean formation, a greater reduction of fluid loss is often desired. Thus, filtration control agents may be included in treatment fluids to achieve an increased reduction of water loss to the formation thereby maintaining the fluidity of a treatment fluid. During drilling operations in particular, the filtration control agent also retains sufficient water in the drilling fluid for effective lubrication and cooling of the drill bit during drilling operations. Filtration control agents may also increase the viscosity of the treatment fluid. Thus, it may be desirable to select a filtration control agent that is capable of achieving the desired fluid loss reduction and that is compatible with the viscosifier so as not to substantially or excessively increase the viscosity of the treatment fluid.

Many existing viscosifiers and filtration control agents are thermally stable up to about 250° F. However, higher temperatures are encountered as wellbores are drilled to deeper depths thus making it desirable for treatment fluids to be thermally stable at temperatures greater than 250° F.

Among the many potential advantages to the methods and compositions of the present disclosure, only some of which are alluded to herein, the methods and compositions of the present disclosure may reduce the fluid loss of high performance treatment fluids, especially in subterranean formations having bottom hole temperatures of greater than 250° F. and/or up to about 400° F., by providing high temperature filtration control agents that are compatible with the high temperature viscosifiers of the present disclosure. The filtration control agents of the present disclosure also may provide readily pumpable treatment fluids by not significantly or excessively increasing the viscosity of the treatment fluids. Without limiting the disclosure to any particular theory or mechanism, it is believed that the viscosifiers and the filtration control agents of the present disclosure are substantially compatible such that when a filtration control agent is added to a treatment fluid comprising a viscosifier of the present disclosure, a reduction in fluid loss may be achieved without a significant or excessive increase in the viscosity of treatment fluid.

In certain embodiments, a treatment fluid comprising an aqueous base fluid, a viscosifier that comprises a tetrapolymer, and a filtration control agent that comprises a graft copolymer comprising a lignite backbone may be provided. Depending on the type of treatment to be performed, the treatment fluid may comprise any treatment fluid known in the art. Treatment fluids that may be useful in accordance with the present disclosure include, but are not limited to, drilling fluids, cement fluids, lost circulation fluids, stimulation fluids (e.g., a fracturing fluids or an acid stimulation fluids), completion fluids, conformance fluids (e.g., water or gas shutoff fluids), sand control fluids (e.g., formation or proppant consolidating fluids), workover fluids, and/or any combination thereof.

The treatment fluids used in accordance with the methods and compositions of the present disclosure may comprise an aqueous base fluid. As used herein, the term "base fluid" refers to the major component of the fluid (as opposed to components dissolved and/or suspended therein), and does not indicate any particular condition or property of that fluids such as its mass, amount, pH, etc. Aqueous base fluids that may be suitable for use in the methods and systems of the present disclosure may comprise water from any source. Such aqueous base fluids may comprise fresh water, salt water (e.g., water containing one or more salts dissolved therein), brine (e.g., saturated salt water), seawater, and/or any combination thereof. In most embodiments of the present disclosure, the aqueous base fluids comprise one or more ionic species, such as those formed by salts dissolved in water. For example, seawater and/or produced water may comprise a variety of divalent cationic species dissolved therein.

In certain embodiments, the density of the aqueous base fluid can be adjusted, among other purposes, to provide additional particulate transport and suspension in the compositions of the present disclosure. In certain embodiments, the pH of the aqueous base fluid may be adjusted (e.g., by a buffer or other pH adjusting agent) to a specific level, which may depend on, among other factors, the types of viscosifiers, acids, and other additives included in the fluid. In certain embodiments, the pH of the treatment fluids of the present disclosure may be adjusted to allow for the solubility of the viscosifiers disclosed herein. One of ordinary skill in the art, with the benefit of this disclosure, will recognize when such density and/or pH adjustments are appropriate. In certain embodiments, the treatment fluids may comprise a mixture of one or more fluids and/or gases, including but not limited to emulsions, foams, and the like.

The treatment fluids used in accordance with the methods and compositions of the present disclosure may comprise a viscosifier comprising a tetrapolymer (i.e., a copolymer comprising four different monomers). In certain embodiments, the tetrapolymer may comprise at least one monomer selected from the group consisting of acrylate, 2-acrylamido-2-methylpropane sulfonic acid (e.g., AMPS®), methacrylic acid, and allyloxy 2-hydroxy propane sulfonic acid, any salt thereof, and/or any combination thereof. In certain embodiments, the tetrapolymer may further comprise one or more other suitable monomers as will occur to one of ordinary skill in the art with the benefit of this disclosure.

The tetrapolymer may comprise the monomers in any configuration and the monomers may be repeated with any frequency or pattern, or in a random nature. One of ordinary skill in the art, with the benefit of this disclosure, will recognize that, in certain embodiments, the tetrapolymers suitable for use in accordance with the methods and compositions of the present disclosure may be in an acid form and/or in a salt form. An example of a tetrapolymer may comprise a first monomer comprising acrylate, a second monomer comprising 2-acrylamido-2-methylpropane sulfonic acid, a third monomer comprising methacrylic acid, and a four monomer comprising allyloxy 2-hydroxy propane sulfonic acid. Each of the monomers may be present in an example tetrapolymer in a variety of different mole ratios.

In certain embodiments, the tetrapolymer may be crosslinked if desired. As used herein, the term "crosslink" and grammatical derivatives thereof refers to a bond linking one monomer or polymer chain to another polymer chain. The bond may be any bond, for example, covalent bond, ionic bond, and the like. One of ordinary skill in the art, with the benefit of this disclosure, will recognize crosslinkers that are suitable for use in accordance with the methods and compositions of the present disclosure. As used herein, the term "crosslinker" refers to a compound, element, or ion used to crosslink that comprises two or more olefinic bonds. Examples of crosslinkers that are suitable for use with the tetrapolymers of the present disclosure include, but are not limited to, pentaerythritol allyl ether and methylenebisacrylamide. In certain embodiments, the tetrapolymer may be a high temperature viscosifier that may be capable maintaining a desired viscosity at bottom hole temperatures of up to about 400° F.

The tetrapolymer used in accordance with the methods and composition of the present disclosure should be present in the treatment fluid in an amount sufficient to provide a desired viscosity. In certain embodiments, the tetrapolymer may be present in the treatment fluid in an amount from about 0.01% to about 10% by weight of the treatment fluid. In certain embodiments, the tetrapolymer may be present in the treatment fluid in an amount from about 0.1% to about 2% by weight of the treatment fluid. In some embodiments, the tetrapolymer may be present in the treatment fluid in an amount from about 0.1% to about 0.5%, in other embodiments, from about 0.5% to about 1%, in other embodiments, from about 1% to about 1.5%, and in other embodiments, from about 1.5% to about 2% by weight of the treatment fluid.

The treatment fluids used in accordance with the methods and composition of the present disclosure also comprise a filtration control agent that comprises a graft copolymer. In certain embodiments, the graft copolymer may comprise a backbone comprising a lignite. In certain embodiments, the graft copolymer further may comprise grafted monomers selected from the group consisting of acrylic sulfonic acid, a methylallyl sulfonic acid, an allyl sulfonic acid, a styrene sulfonic acid, a vinyl sulfonic acid, a vinyl aromatic sulfonic acid, 2-acrylamido-2-methylpropane sulfonic acid, acrylamide, N-substituted acrylamides, methacrylamide, N-substituted methacrylamides, acrylates, methacrylates, acrylic acid, methacrylic acid, acrylonitrile, N-allylamides, vinyl alcohol, vinyl ethers, vinyl esters, allyl alcohol, allyl ethers, allyl esters, vinylpyridine, vinylimidazole, allylimidazole, vinylphosphonic acid (VPA), vinylpyrollidone, diallyldimethylammonium chloride (DADMAC), any salts thereof, and/or any combinations thereof. In certain embodiments, the graft copolymer may further comprise one or more other suitable monomers as will occur to one of ordinary skill in the art with the benefit of this disclosure. The graft copolymer may comprise at least two monomers in any configuration and the monomers may be repeated with any frequency. In certain embodiments, the grafted monomers may be present in the graft copolymer in one or more pendant groups attached to the backbone in a random nature. In such embodiments, each pendant group may comprise one or more grafted monomers in a random nature.

One of ordinary skill in the art, with the benefit of this disclosure, will recognize the graft copolymers suitable for use in accordance with the methods and compositions of the present disclosure may be in an acid form and/or in a salt form. As will be appreciated, a variety of salts of the graft copolymers may be prepared, for example, by neutralizing the acid form of acrylic sulfonic acid, a methylallyl sulfonic acid, an allyl sulfonic acid, a styrene sulfonic acid, a vinyl sulfonic acid, a vinyl aromatic sulfonic acid, 2-acrylamido-2-methylpropane sulfonic acid, acrylic acid, methacrylic acid, and/or VPA with an alkaline agent. By way of example, suitable alkaline agents may include sodium hydroxide, potassium hydroxide, ammonium hydroxide or the like. This neutralization may occur, for example, either prior to or after the polymerization of the graft copolymer. By way of example, a salt of 2-acrylamido-2-methylpropane sulfonic acid (such as the sodium salt of 2-acrylamido-2-methylpropane sulfonic acid) may be used in the polymerization of the graft copolymer.

The backbone of the graft copolymer may comprise lignite. As used herein, the term "lignite" includes one or more of a variety of low rank coals including, but not limited to, oxidized lignite (e.g., leonardite), mined lignite, modified lignite (e.g., lignosulfonate) brown coal, and/or slack. One of ordinary skill in the art, with the benefit of this disclosure, will recognize that the lignite may be treated with a caustic (e.g., potassium hydroxide, sodium hydroxide, or ammonium hydroxide) to solubilize the lignite in water. For example, treatment of lignite with a caustic solution generally may dissolve or disperse a portion of the lignite into the solution, and solution then may be concentrated to increase the lignite solution or may be used directly in the polymerization to create the graft copolymer. In certain embodiments, the backbone further may comprise polyvinyl alcohol, polyethylene oxide, polypropylene oxide, polyethyleneimine, and/or any combinations thereof.

The graft copolymer used in accordance with the methods and compositions of the present disclosure may comprise a sufficient amount of the backbone to provide a desirable level of fluid loss control. In certain embodiments, the backbone may be present in the graft copolymer in an amount from about 5% to about 95% by weight of the graft copolymer on a dry basis. In certain embodiments, the backbone may be present in the graft copolymer in an amount from about 10% to about 50% by weight of the graft copolymer on a dry basis. In certain embodiments, the backbone may be present in the graft copolymer in an amount from about 10% to about 30% by weight of the graft copolymer on a dry basis.

The graft copolymer used in accordance with the methods and compositions of the present disclosure may comprise a sufficient amount of the grafted monomers to provide a desirable level of fluid loss control. In certain embodiments, the grafted monomers may be present in the graft copolymer in an amount from about 5% to about 95% by weight of the graft copolymer on a dry basis. In certain embodiments, the grafted monomers may be present in the graft copolymer in an amount from about 40% to about 90% by weight of the graft copolymer on a dry basis. In certain embodiments, the grafted monomers may be present in the graft copolymer in an amount from about 70% to about 90% by weight of the graft copolymer on a dry basis. One of ordinary skill in the art, with the benefit of this disclosure, will recognize that the amount of each of the grafted monomers present in the graft copolymer is dependent upon a number of factors, including cost, the temperature of use, the desired molecular weight of the graft copolymer, dispersive properties and desired amount of fluid loss control, to name a few examples.

An example of a filtration control agent may comprise a graft copolymer that comprises a lignite backbone grafted with a first monomer comprising 2-acrylamido-2-methylpropane sulfonic acid and a second monomer comprising acrylonitrile. Each of these grafted monomers may be present in an example graft copolymer in a variety of different mole ratios. For example, the graft copolymer may have a first grafted monomer-to-second grafted monomer mole ratio in the range of from about 1:1 to about 10:1.

The filtration control agents of the present disclosure should be compatible with the treatment fluids and viscosifiers of the present disclosure such that the filtration control agents do not significantly or excessively increase the viscosity of the treatment fluid. In certain embodiments, the filtration control agent may be a high temperature filtration control agent that may be capable of achieving a desired fluid loss control at bottom hole temperatures of up to about 400° F. One example of a commercially available filtration control additive is Halad®-413, available from Halliburton Energy Services, Inc., Houston, Tex.

The filtration control agent used in accordance with the methods and composition of the present disclosure should be present in the treatment fluid in an amount sufficient to provide a desired level of fluid loss control. In certain embodiments, the filtration control agent may be present in the treatment fluid in an amount from about 0.01% to about 10% by weight of the treatment fluid. In certain embodiments, the filtration control agent may be present in the treatment fluid in an amount from about 0.5% to about 3% by weight of the treatment fluid. In some embodiments, the filtration control agent may be present in the treatment fluid in an amount from about 0.5% to about 1%, in other embodiments, from about 1% to about 1.5%, in other embodiments, from about 1.5% to about 2%, in other embodiments, from about 2% to about 2.5%, and in other embodiments, from about 2.5% to about 3% by weight of the treatment fluid.

In certain embodiments, the treatment fluids used in accordance with the methods and compositions of the present disclosure optionally may comprise any number of additional additives. Examples of such additional additives include, but are not limited to, salts, surfactants, acids, proppant particulates, diverting agents, additional fluid loss control additives, gas, nitrogen, carbon dioxide, surface modifying agents, tackifying agents, foamers, corrosion inhibitors, scale inhibitors, catalysts, clay control agents, shale inhibitors, biocides, friction reducers, antifoam agents, bridging agents, flocculants, $H_2S$ scavengers, $CO_2$ scavengers, oxygen scavengers, lost circulation materials, lubricants, additional viscosifiers, breakers, weighting agents, relative permeability modifiers, resins, wetting agents, coating enhancement agents, filter cake removal agents, antifreeze agents (e.g., ethylene glycol), and the like. In certain embodiments, one or more of these optional additives (e.g., a shale inhibitor) may be added to the treatment fluid and/or activated after the viscosifier has been at least partially hydrated in the fluid. A person skilled in the art, with the benefit of this disclosure, will recognize the types of additives that may be included in the fluids of the present disclosure for a particular application.

In certain embodiments, the treatment fluids of the present disclosure may exhibit a plastic viscosity of from about 10 cP to about 100 cP. In some embodiments, the treatment fluids of the present disclosure may exhibit a plastic viscosity of from about 20 cP to about 50 cP. In certain embodiments, the treatment fluids of the present disclosure may exhibit a yield point of from about 10 lb/100 ft$^2$ to about 60 lb/100 ft$^2$. In some embodiments, the treatment fluids of the present disclosure may exhibit a yield point of from about 20 lb/100 ft$^2$ to about 50 lb/100 ft$^2$.

The treatment fluids of the present disclosure may be prepared using any suitable method and/or equipment (e.g., blenders, mixers, stirrers, etc.) known in the art at any time prior to their use. The treatment fluids may be prepared at a well site or at an offsite location.

The present disclosure in some embodiments provides methods for using the treatment fluids to carry out a variety of subterranean treatments or operations, including but not limited to, drilling operations, cementing operations, fracturing operations, gravel packing operations, workover operations, and the like. In some embodiments, the treatment fluids of the present disclosure may be drilling fluids used for drilling a wellbore into a subterranean formation. In certain embodiments, the drilling fluids may comprise a low concentration of solids, for example, the drilling fluids may be substantially free of added clays or other types of solids which may plug formation zones. As used herein, the term "added clay" refers to a clay added to a drilling fluid prior to the introduction of the drilling fluid into a subterranean formation.

In certain embodiments, a treatment fluid may be introduced into a subterranean formation. In certain embodiments, the subterranean formation may have a bottom hole temperature of from about 150° F. to about 400° F. In certain embodiments, the subterranean formation may have a bottom hole temperature of at least 350° F. In some embodiments, the treatment fluid may be used to drill at least a portion of a wellbore in the subterranean formation. In some embodiments, the treatment fluid may circulate through the wellbore while drilling into the subterranean formation. In some embodiments, the treatment fluid may be introduced into a wellbore that penetrates a subterranean formation. In certain embodiments, the treatment fluid may be introduced into the wellbore using one or more pumps.

In certain embodiments of the present disclosure, the treatment fluids of the present disclosure may be introduced into a subterranean formation, a wellbore penetrating a subterranean formation, tubing (e.g., pipeline), and/or a container using any method or equipment known in the art. Introduction of the treatment fluids of the present disclosure may in such embodiments include delivery via any of a tube, umbilical, pump, gravity, and combinations thereof. The treatment fluids of the present disclosure may, in various embodiments, be delivered downhole (e.g., into the wellbore) or into top-side flowlines/pipelines or surface treating equipment. For example, in certain embodiments, the treatment fluids of the present disclosure may be applied to a subterranean formation and/or wellbore using batch treatments, squeeze treatments, continuous treatments, and/or combinations thereof.

The treatment fluids of the present disclosure may directly or indirectly affect one or more components or pieces of equipment associated with the preparation, delivery, recapture, recycling, reuse, and/or disposal of the disclosed treatment fluids. For example, and with reference to FIG. 1, the disclosed treatment fluids may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed treatment fluids may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed treatment fluids may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed treatment fluids may be stored, reconditioned, and/or regulated until added to the drilling fluid 122.

As mentioned above, the disclosed treatment fluids may directly or indirectly affect the components and equipment of the drilling assembly 100. For example, the disclosed treatment fluids may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, The fluid processing unit(s) 128 may further include one or more sensors, gauges, pumps, compressors, and the like used store, monitor, regulate, and/or recondition the exemplary treatment fluids.

The disclosed treatment fluids may directly or indirectly affect the pump 120, which representatively includes any conduits, pipelines, trucks, tubulars, and/or pipes used to fluidically convey the treatment fluids downhole, any pumps, compressors, or motors (e.g., topside or downhole) used to drive the treatment fluids into motion, any valves or related joints used to regulate the pressure or flow rate of the treatment fluids, and any sensors (i.e., pressure, temperature, flow rate, etc.), gauges, and/or combinations thereof, and the like. The disclosed treatment fluids may also directly or indirectly affect the mixing hopper 134 and the retention pit 132 and their assorted variations.

The disclosed treatment fluids may also directly or indirectly affect the various downhole equipment and tools that may come into contact with the treatment fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed treatment fluids may also directly or indirectly affect any downhole heat exchangers, valves and corresponding actuation devices, tool seals, packers and other wellbore isolation devices or components, and the like associated with the wellbore 116. The disclosed treatment fluids may also directly or indirectly affect the drill bit 114, which may include, but is not limited to, roller cone bits, PDC bits, natural diamond bits, any hole openers, reamers, coring bits, etc.

While not specifically illustrated herein, the disclosed treatment fluids may also directly or indirectly affect any transport or delivery equipment used to convey the treatment fluids to the drilling assembly 100 such as, for example, any conduits, pipelines, trucks, tubulars, and/or pipes used to fluidically move the treatment fluids from one location to another, any pumps, compressors, or motors used to drive the treatment fluids into motion, any valves or related joints used to regulate the pressure or flow rate of the treatment fluids, and any sensors (i.e., pressure and temperature), gauges, and/or combinations thereof, and the like.

An embodiment of the present disclosure is a method comprising: A method of treating a subterranean formation comprising: providing a treatment fluid comprising: an aqueous base fluid; a tetrapolymer that comprises at least one monomer selected from the group consisting of: acrylate, 2-acrylamido-2-methylpropane sulfonic acid, methacrylic acid, and allyloxy 2-hydroxy propane sulfonic acid, any salt thereof, and any combination thereof; and a graft copolymer that comprises: a backbone comprising a lignite; and at least one monomer selected from the group consisting of: acrylic sulfonic acid, a methylallyl sulfonic acid, an allyl sulfonic acid, a styrene sulfonic acid, a vinyl sulfonic acid, a vinyl aromatic sulfonic acid, 2-acrylamido-2-methylpropane sulfonic acid, acrylamide, a N-substituted acrylamide, methacrylamide, a N-substituted methacrylamide, an acrylate, a methacrylate, acrylic acid, methacrylic acid, acrylonitrile, a N-allylamide, a vinyl alcohol, a vinyl ether, a vinyl ester, an allyl alcohol, an allyl ether, an allyl ester, vinylpyridine, vinylimidazole, allylimidazole, vinylphosphonic acid, vinylpyrollidone, diallyldimethylammonium chloride, any salt thereof, and any combination thereof; and introducing the treatment fluid into a wellbore penetrating the subterranean formation.

Another embodiment of the present disclosure is a method comprising: providing a drilling fluid comprising: an aqueous base fluid; a tetrapolymer that comprises at least one monomer selected from the group consisting of: acrylate, 2-acrylamido-2-methylpropane sulfonic acid, methacrylic acid, and allyloxy 2-hydroxy propane sulfonic acid, any salt thereof, and any combination thereof; and a graft copolymer that comprises: a backbone comprising lignite; and at least one monomer selected from the group consisting of: acrylic sulfonic acid, a methylallyl sulfonic acid, an allyl sulfonic acid, a styrene sulfonic acid, a vinyl sulfonic acid, a vinyl aromatic sulfonic acid, 2-acrylamido-2-methylpropane sulfonic acid, acrylamide, a N-substituted acrylamide, methacrylamide, a N-substituted methacrylamide, an acrylate, a methacrylate, acrylic acid, methacrylic acid, acrylonitrile, a N-allylamide, a vinyl alcohol, a vinyl ether, a vinyl ester, an allyl alcohol, an allyl ether, an allyl ester, vinylpyridine, vinylimidazole, allylimidazole, vinylphosphonic acid, vinylpyrollidone, diallyldimethylammonium chloride, any salt thereof, and any combination thereof; and using the drilling fluid to drill at least a portion of a wellbore in the subterranean formation.

Another embodiment of the present disclosure is a composition comprising: an aqueous base fluid; a tetrapolymer that comprises at least one monomer selected from the group consisting of: acrylate, 2-acrylamido-2-methylpropane sulfonic acid, methacrylic acid, and allyloxy 2-hydroxy propane sulfonic acid, any salt thereof, and any combination thereof; and a graft copolymer that comprises: a backbone comprising lignite; and at least one monomer selected from the group consisting of: acrylic sulfonic acid, a methylallyl sulfonic acid, an allyl sulfonic acid, a styrene sulfonic acid, a vinyl sulfonic acid, a vinyl aromatic sulfonic acid, 2-acrylamido-2-methylpropane sulfonic acid, acrylamide, a N-substituted acrylamide, methacrylamide, a N-substituted methacrylamide, an acrylate, a methacrylate, acrylic acid, methacrylic acid, acrylonitrile, a N-allylamide, a vinyl alcohol, a vinyl ether, a vinyl ester, an allyl alcohol, an allyl ether, an allyl ester, vinylpyridine, vinylimidazole, allylimidazole, vinylphosphonic acid, vinylpyrollidone, diallyldimethylammonium chloride, any salt thereof, and any combination thereof.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLES

Example 1

Two treatment fluids comprising a tetrapolymer of the present disclosure were prepared as shown in Table 1 with Formulation B further comprising a graft copolymer of the present disclosure (Halad®-413). The shear stress and shear rate data for the two treatment fluids were measured upon mixing and again after static aging at 400° F. for 16 hours using a Model 35A FANN® Viscometer. The rheological characteristics of each treatment fluid, including the yield point and plastic viscosity, were determined in accordance with the procedure set forth by the American Petroleum Institute (API) in API RP 13B-1, *Recommended Practice for Field Testing of Water-Based Drilling Fluids*. The fluid loss of each treatment fluid was determined using the high temperature, high pressure filtration test at 350° F. according to API RP 13B-1.

As indicated by the performance of Formulation A in Table 1, the tetrapolymers of the present disclosure are effective high temperature viscosifiers, but a filtration control agent such as a graft copolymer of the present disclose facilitates reducing the fluid loss. As indicated by the performance of Formula B in Table 1, the filtration control agents of the present disclose are compatible with the viscosifiers of the present disclosure and are effective high temperature filtration control agents. Thus, Example 1 demonstrates that the filtration control agents and the viscosifiers of the present disclosure are compatible such that the filtration control agents of the present disclosure may reduce fluid loss without significantly increasing the viscosity of the treatment fluid comprising the viscosifiers of the present disclosure.

TABLE 1

|  | 14.0 ppg Formulation | | | |
|---|---|---|---|---|
|  | A | | B | |
| Tap water, bbl | 0.79 | | 0.79 | |
| Sodium bicarbonate, lb/bbl | 1.7 | | 1.7 | |
| Soda ash, lb/bbl | 10.6 | | 10.6 | |
| Tetrapolymer, lb/bbl | 2.1 | | 2.1 | |
| Graft copolymer (Halad ®-413), lb/bbl | — | | 6.0 | |
| THERMA-THIN ®, lb/bbl | 3.0 | | 3.0 | |
| Barite, lb/bbl | 311.0 | | 311.0 | |
| Static aging conditions, 16 h at ° F. | — | 400 | — | 400 |
| 600 rpm | 51 | 75 | 92 | 94 |
| 300 rpm | 38 | 56 | 58 | 61 |
| 200 rpm | 33 | 48 | 45 | 47 |
| 100 rpm | 27 | 40 | 30 | 30 |
| 6 rpm | 16 | 20 | 11 | 7 |
| 3 rpm | 15 | 18 | 10 | 6 |
| Plastic viscosity, cP | 13 | 19 | 34 | 33 |
| Yield point, lb/100 ft$^2$ | 25 | 37 | 24 | 28 |
| Fluid loss, mL, 350° F. | — | 57.0 | — | 26.0 |

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method of treating a subterranean formation comprising:
   providing a treatment fluid comprising:
      an aqueous base fluid;
      a tetrapolymer that consists of: (i) acrylate, (ii) 2-acrylamido-2-methylpropane sulfonic acid, (iii) methacrylic acid, and (iv) allyloxy 2-hydroxy propane sulfonic acid; and
      a graft copolymer that comprises:
         a backbone comprising a lignite, and
         at least one monomer selected from the group consisting of: acrylic sulfonic acid, a methylallyl sulfonic acid, an allyl sulfonic acid, a styrene sulfonic acid, a vinyl sulfonic acid, a vinyl aromatic sulfonic acid, 2-acrylamido-2-methylpropane sulfonic acid, acrylamide, a N-substituted acrylamide, methacrylamide, a N-substituted methacrylamide, an acrylate, a methacrylate, acrylic acid, methacrylic acid, acrylonitrile, a N-allylamide, a vinyl alcohol, a vinyl ether, a vinyl ester, an allyl alcohol, an allyl ether, an allyl ester, vinylpyridine, vinylimidazole, allylimidazole, vinylphosphonic acid, vinylpyrollidone, diallyldimethylammonium chloride, any salt thereof, and any combination thereof; and
   introducing the treatment fluid into a wellbore penetrating the subterranean formation.

2. The method of claim 1 further comprising circulating the treatment fluid through the wellbore while drilling into the subterranean formation.

3. The method of claim 1 wherein the treatment fluid is substantially free of added clay.

4. The method of claim 1 wherein a crosslinker is used to crosslink the tetrapolymer.

5. The method of claim 1 wherein the graft copolymer comprises a 2-acrylamido-2-methylpropane sulfonic acid monomer and an acrylonitrile monomer.

6. The method of claim 1 wherein the tetrapolymer is present in the treatment fluid in an amount from about 0.01% to about 10% by weight of the treatment fluid.

7. The method of claim 1 wherein the graft copolymer is present in the treatment fluid in an amount from about 0.01% to about 10% by weight of the treatment fluid.

8. The method of claim 1 wherein the subterranean formation has a bottom hole temperature of at least 350° F.

9. The method of claim 1 wherein the treatment fluid has a plastic viscosity of from about 10 cP to about 100 cP.

10. The method of claim 1 wherein the treatment fluid has a yield point of from about 10 lb/100 ft$^2$ to about 60 lb/100 ft$^2$.

11. The method of claim 1 wherein the graft copolymer reduces loss of the treatment fluid in the subterranean formation.

12. A method of drilling a wellbore in a subterranean formation comprising:
   providing a drilling fluid comprising:
      an aqueous base fluid;
      a tetrapolymer that consists of: (i) acrylate, (ii) 2-acrylamido-2-methylpropane sulfonic acid, (iii) methacrylic acid, and (iv) allyloxy 2-hydroxy propane sulfonic acid; and
      a graft copolymer that comprises:
         a backbone comprising lignite, and
         at least one monomer selected from the group consisting of: acrylic sulfonic acid, a methylallyl sulfonic acid, an allyl sulfonic acid, a styrene sulfonic acid, a vinyl sulfonic acid, a vinyl aromatic sulfonic acid, 2-acrylamido-2-methylpropane sulfonic acid, acrylamide, a N-substituted acrylamide, methacrylamide, a N-substituted methacrylamide, an acrylate, a methacrylate, acrylic acid, methacrylic acid, acrylonitrile, a N-allylamide, a vinyl alcohol, a vinyl ether, a vinyl ester, an allyl alcohol, an allyl ether, an allyl ester, vinylpyridine, vinylimidazole, allylimidazole, vinylphosphonic acid, vinylpyrollidone, diallyldimethylammonium chloride, any salt thereof, and any combination thereof; and
   using the drilling fluid to drill at least a portion of the wellbore in the subterranean formation.

13. The method of claim 12 wherein the treatment fluid is substantially free of added clay.

14. The method of claim 12 wherein a crosslinker is used to crosslink the tetrapolymer.

15. The method of claim 12 wherein the graft copolymer comprises 2-acrylamido-2-methylpropanesulfonic acid and acrylonitrile monomers.

16. A treatment fluid comprising:
    an aqueous base fluid;
    a tetrapolymer that consists of: (i) acrylate, (ii) 2-acrylamido-2-methylpropane sulfonic acid, (iii) methacrylic acid, and (iv) allyloxy 2-hydroxy propane sulfonic acid; and
    a graft copolymer that comprises:
        a backbone comprising lignite, and
        at least one monomer selected from the group consisting of: acrylic sulfonic acid, a methylallyl sulfonic acid, an allyl sulfonic acid, a styrene sulfonic acid, a vinyl sulfonic acid, a vinyl aromatic sulfonic acid, 2-acrylamido-2-methylpropane sulfonic acid, acrylamide, a N-substituted acrylamide, methacrylamide, a N-substituted methacrylamide, an acrylate, a methacrylate, acrylic acid, methacrylic acid, acrylonitrile, a N-allylamide, a vinyl alcohol, a vinyl ether, a vinyl ester, an allyl alcohol, an allyl ether, an allyl ester, vinylpyridine, vinylimidazole, allylimidazole, vinylphosphonic acid, vinylpyrollidone, diallyldimethylammonium chloride, any salt thereof, and any combination thereof.

17. The treatment fluid of claim 16 wherein the treatment fluid is substantially free of added clay.

18. The treatment fluid of claim 16 wherein the graft copolymer comprises a 2-acrylamido-2-methylpropane sulfonic acid monomer and an acrylonitrile monomer.

19. The treatment fluid of claim 16 wherein the tetrapolymer is present in the treatment fluid in an amount from about 0.01% to about 10% by weight of the treatment fluid.

20. The treatment fluid of claim 16 wherein the graft copolymer is present in the treatment fluid in an amount from about 0.01% to about 10% by weight of the treatment fluid.

* * * * *